United States Patent [19]

Bindin

[11] Patent Number: 4,732,824

[45] Date of Patent: Mar. 22, 1988

[54] ALKALI METAL ELECTRO-CHEMICAL STORAGE CELL

[75] Inventor: Peter J. Bindin, Runcorn, Great Britain

[73] Assignee: Chloride Silent Power Limited, London, England

[21] Appl. No.: 46,856

[22] PCT Filed: Jul. 23, 1986

[86] PCT No.: PCT/GB86/00441

§ 371 Date: Mar. 24, 1987

§ 102(e) Date: Mar. 24, 1987

[87] PCT Pub. No.: WO87/00695

PCT Pub. Date: Jan. 29, 1987

[30] Foreign Application Priority Data

Jul. 24, 1985 [GB] United Kingdom ............... 8518661

[51] Int. Cl.$^4$ ............................................... H01M 6/20
[52] U.S. Cl. ....................................... 429/104; 429/49
[58] Field of Search ................. 429/104, 150, 191, 49, 429/61

[56] References Cited

U.S. PATENT DOCUMENTS

| | | | |
|---|---|---|---|
| 4,124,739 | 11/1978 | Sudworth | 429/104 X |
| 4,252,869 | 2/1981 | Heitz et al. | 429/104 X |
| 4,638,555 | 1/1987 | MacLachlan et al. | 429/104 X |
| 4,657,830 | 4/1987 | Kagawa | 429/104 |

Primary Examiner—Anthony Skapars
Attorney, Agent, or Firm—Finnegan, Henderson, Farabow, Garrett & Dunner

[57] ABSTRACT

An alkali metal electro-chemical storage cell comprising anode and cathode regions containing alkali metal and cathodic reactant respectively. A cationically conductive solid electrolyte member separating the anode and cathode regions and respective anode and cathode current collectors. The cell is formed with a contact breaker region which in the event of a breach in the electrolyte member functions to make the cell become an open circuit and thus not provide a discharge path for any other cells connected thereto.

8 Claims, 1 Drawing Figure

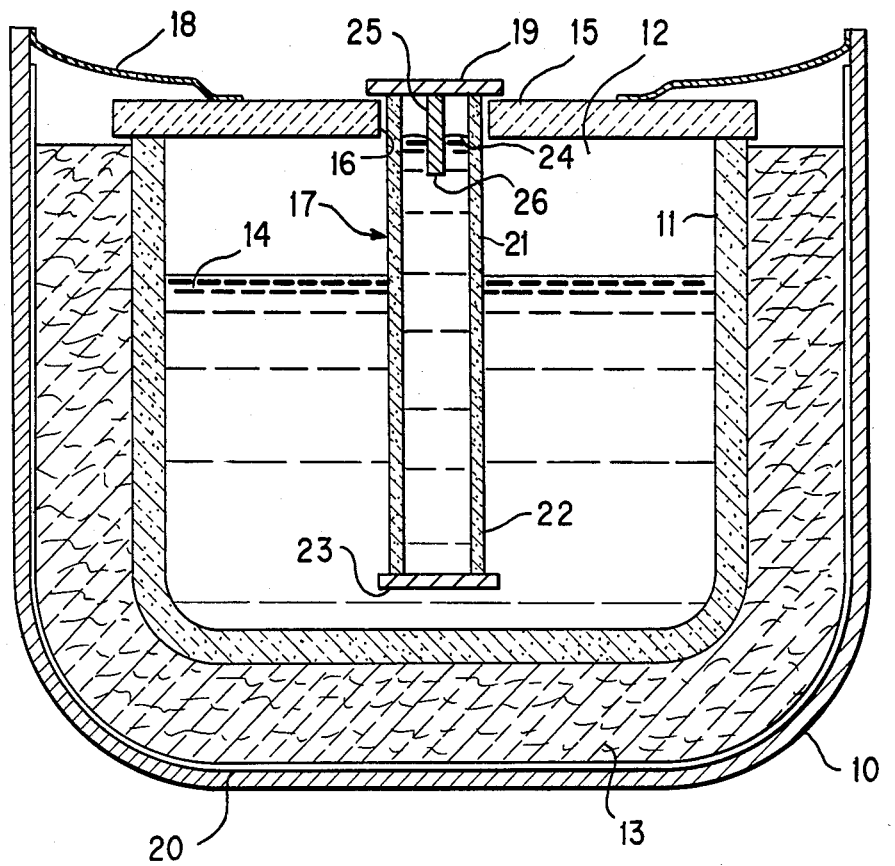

ALKALI METAL ELECTRO-CHEMICAL STORAGE CELL

The present invention relates to an alkali metal electro-chemical storage cell, for example a sodium/sulphur cell.

Typically, such cells are formed with a metal casing, a solid electrolyte element dividing the interior of the casing into anode and cathode regions and current collectors in the anode and cathode regions associated with external terminals for making connections to the cell. The anode region contains alkali metal, for example sodium, which is in liquid form at the operating temperature of the cell, and the cathode region contains a cathode reactant material, such as sulphur. The solid electrolyte material is formed of an electronically insulating material which is conductive to cations of the alkali metal. In a fully charged condition, the cathode region of a sodium/sulphur cell contains substantially pure sulphur and the anode region contains liquid sodium up to a maximum level. As the cell discharges, the level of sodium in the anode region declines and sodium polysulphides are formed in the cathode region.

A problem with such cells is in the fabrication of an appropriate electrolyte element. In sodium sulphur cells, the electrolyte element is normally made of beta alumina and may be formed as a tube fitting within the outer metal casing of the cell, so that the inside of the tube forms one of the anode and cathode regions and the annular space between the tube and the outer casing forms the other region. It is difficult to make tubes of beta alumina which have high strength, especially in view of the high temperatures, in the order of 350° C. for sodium/sulphur cells, at which the cell has to operate, and the stresses resulting from temperature cycling in use. Accordingly, a problem with such cells is the possibility of the solid electrolyte element failing in use so that there can be direct reaction between the anode and cathode reactants.

A solid electrolyte element can fail by a small crack developing which may permit sulphur from the cathode region to penetrate into the anode region and react directly with the sodium therein. As a result, the anode region becomes progressively more contaminated with sodium polysulphides and the cell eventually loses its open circuit potential. In practice, alkali metal cells are configured in batteries comprising a plurality of cells connected in parallel and in series parallel configurations. Series connection of the cells is necessary so that the battery has a desired output voltage in excess of the potential of a single cell. Parallel connection is desirable so that the battery has the necessary storage capacity.

When the solid electrolyte element of a cell is breached as mentioned above, and the cell loses its output potential due to direct reaction between the cathode and anode reactants, the damaged cell has a finite resistance between the anode and cathode terminals. As a result, a damaged cell in a parallel connected set of cells in a battery can result in the other cells connected in parallel therewith discharging by current flowing in the reverse direction through the damaged cell.

The present invention sets out to provide an alkali metal electro chemical storage cell which becomes open circuit in the event of a breach in the solid electrolyte element of the cell. It can be seen that if the damaged cell becomes open circuit. other parallel connected cells in the battery will not become discharged through the damaged cell and can still provide current to an external load.

In accordance with the present invention, an alkali metal electro-chemical storage cell comprises anode and cathode regions containing alkali metal and cathodic reactant respectively, a cationically conductive solid electrolyte member separating the anode and cathode regions, and respective anode and cathode current collectors and associated connection terminals, the anode current collector comprising a further cationically conductive solid electrolyte member extending into alkali metal in said anode region and separating a contact breaker region from alkali metal in said anode region, a body of the alkali metal contained in the contact breaker region, normally up to at least a predetermined level in a functional undamaged cell, a first electrically conductive member providing electronic interconnection between alkali metal in the contact breaker region and alkali metal in the anode region when at the minimum state of charge of the cell, and a second electrically conductive member providing electronic interconnection between the connection terminal associated with the anode current collector and said alkali metal in the contact breaker region only when at and above said predetermined level.

With such an arrangement, in normal operation of an undamaged cell, i.e. with no breach in the electrolyte member separating the anode and cathode regions, anode current flows between the alkali metal in the anode region and the anode connection terminal via alkali metal contained in the contact breaker region which interconnects said first and second electrically conductive members. Thus, the cell operates normally when undamaged.

In the event of a branch in the electrolyte member separating the anode and cathode regions, cathodic reactant penetrates the anode region forming compounds of the alkali metal and the cathodic reactant therein. There is then formed a second internal cell comprising an anode constituted by the contact breaker region containing alkali metal and a cathode comprising the original anode region containing the alkali metal/cathodic reactant compounds. The presence of these compounds in the anode region causes alkali metal cations to migrate through the solid electrolyte material of the further electrolyte member from the contact breaker region into the original anode region so as further to react with the compounds therein. At the same time, electrons released by the alkali metal cations migrating from the contact breaker region are electronically conducted through the alkali metal and said first electrically conductive member directly into the original anode region. As a result, the inner "cell" progressively discharges with a resultant drop in the level of alkali metal in the contact breaker region. When the alkali metal level in the contact breaker region drops below said predetermined level, contact is lost between the alkali metal and said second electrically conductive member, whereupon the anode connection terminal of the cell as a whole becomes isolated, so that the cell becomes an open circuit.

In this way, a contact breaker or "fuse" is provided which ensures that a cell in a battery which is damaged by a breach in the main solid electrolyte becomes open circuit whereupon it does not provide a discharge path for additional cells connected in parallel.

An example of the present invention will now be described with reference to the accompanying drawing which is a cross sectional view through a sodium sulphur cell embodying the present invention.

The illustrated cell has cylindrical symmetry and comprises an outer casing 10 of steel. Within the casing 10 there is a tubular electrolyte element 11 dividing the interior of the casing into anode and cathode regions 12 and 13. The interior of the electrolyte element 11 is the anode region 12 and contains sodium 14 which is liquid at the operating temperature, typically 350° C., of the cell. The annular space forming the cathode region 13 contains a felt of carbon fibres impregnated with sulphur to form the cathodic reactant. The electrolyte material of the electrolyte member 11 is betal alumina which is electronically insulating but conductive to cations of sodium.

Both the anode and cathode regions 12 and 13 are hermetically sealed. The anode region 12 is sealed primarily by a ceramic lid 15 closing an open end of the electrolyte tube 11. The ceramic lid 15 is typically glazed to the tube 11 about one end thereof, and has a central aperture 16 through which extends a current collector indicated generally at 17 which extends down into the sodium 14. The current collector 17 is itself hermetically sealed in the opening 16.

The cathode region 13 is sealed by means of an annular disc 18, typically of a steel alloy which is welded about its outer periphery to the casing 10 and is hermetically sealed about its inner periphery to the surface of the ceramic lid 15. The ceramic lid 15 may be made of alpha alumina.

The current collector 17 provides, in normal operation of the cell, an eletronic interconnection between sodium 14 contained within the anode region and a connection terminal 19 on the exterior of the cell. The interior surface of the casing 10 may be lined, as at 20 with a material which is resistant to attack by hot sulphur/sodium polysulphides. This material may be graphite foil. The casing 10 forms the cathode connection terminal of the cell. In normal operation of the cell, a resistive load connected between the anode connection terminal 19 and the casing 10 permits a positive current flow from the casing 10 to the anode terminal 19 accompanied by a flow of sodium cations from the sodium in the anode region 12 through the solid electrolyte 11 to form sodium polysulphides in the cathode region. As the cell discharges, the level of sodium in the anode region 12 falls. The cell is recharged by the application of a charging current in the reverse direction through the cell which drives sodium cations back into the anode region from the cathode region.

The structure of cell described so far forms no part of the present invention and is indeed similar to that described in GB-A-No. 2102622.

In accordance with this embodiment of the invention, the anode current collector is formed of a tube 21 of beta alumina. The tube extends downwards, in the normal orientation of the cell as shown in the drawing, from the aperture 16 in the lid 15, into the sodium 14 contained in the anode region 12. The bottom end 22 of the electrolyte tube 21 is closed by a metal disc 23. The tube 21 extends near to the bottom end of the tubular electrolyte element 11 so that the metal disc 23 is immersed in the sodium, and in electronic contact therewith, until the cell is substantially completely discharged.

In the embodiments shown, the upper end of the electrolyte tube 21 is closed with a further metal disc constituting the anode connection terminal 19. The complete anode current collector 17 is secured in the aperture 16 in the lid 15 by means of the connection disc 19 which is itself sealed about the upper periphery of the aperture 16.

The electrolyte tube 21 is nearly filled with sodium up to the level 24 as illustrated. A metal rod 25 is connected to the disc 19 and extends downwards from the disc into the sodium within the tube 21.

In normal operation of the cell, the electrolyte tube 21 remains substantially filled with sodium up to substantially the level 24 so that the sodium in the tube provides an electronic interconnection between the rod 25, and thence the anode connection terminal 19, and the metal disc 23 at the other end of the tube 21, which is in turn in contact with sodium 14 in the anode region.

The normal charging and discharging cycle of the cell does not substantially effect the level of sodium within the electrolyte tube 21 because of the good electrical connection between the sodium within the tube and the sodium in the anode region, via the metal disc 23.

However, in the event of a breach in the solid electrolyte member 11, permitting sulphur or sodium polysulphides to penetrate from the cathode region into the anode region, the anode region becomes contaminated with sodium polysulphides. The reaction of sodium ions with sulphur produce successive polysulphides progressively reducing the sulphur. In a normally constructed sodium sulphur cell, there is only sufficient sodium provided in the anode region, in relation to the sulphur contained in the cathode region, for the sulphur to be reduced to the level $Na_2S_3$. Additional sodium could permit the sulphur to be further reduced to $Na_2S_2$.

Accordingly, the presence of a breach in the electrolyte member 11 will result in sodium polysulphides being present in the anode region which are not fully reduced. The presence of these sodium polysulphides produces a further electro-chemical reaction with the sodium within the electrolyte tube 21. Sodium ions from within the tube will migrate through the beta alumina material of the tube to react with the sodium polysulphides in the anode region with an attendant flow of electronic current from the anode region back to the sodium within the tube 21 via the metal disc 23. This reaction will progressively reduce the level of sodium within the tube 21 until the sodium drops below the level of the lower end of the metal rod 25, this defining a contact breaker or "fuse" region 26, and connection between the sodium and the anode connection terminal 19 is broken, so that the cell becomes open circuit.

The construction illustrated in the Figure also has a further advantage. A small crack developing in the solid electrolyte member 11 can also produce an electronic path which bridges the anode region 12 and the cathode region 13 without necessarily causing significant contamination of the sodium in the anode region. In this case, the cell may lose its open circuit potential and so be capable of accepting some overcharge. The embodiment limits the amount of such overcharge which is failing cell can accept from cells connected in parallel. In this event, the level of sodium 24 within the anode current collector 17 will rise above its normal maximum level through migration of sodium ion through the tube 21 from the anode region. As a result an increase in pressure will develop in the tube 21. In the embodiment shown, this excess pressure causes a preferential fracture between the connection terminal 19 and the electrolyte tube 21. This allows the collector 17 to drop, whereupon the anode connection terminal of the cell becomes isolated an the cell becomes open-circuit.

It may be appreciated that the described embodiment of the cell is a "central sodium" cell having the anode region in the centre. Appropriate embodiments of the invention may be devised for the central sulphur type of cell.

Furthermore, the invention is applicable not only to sodium/sulphur cells but also to other forms of alkali metal electro-chemical storage cell.

I claim:

1. An alkali metal electro-chemical storage cell comprising anode and cathode regions containing alkali metal and cathodic reactant respectively, a cationically conductive solid electrolyte member separating the anode and cathode regions, and respective anode and cathode current collectors and associated connection terminals, the anode current collector comprising a further cationically conductive solid electrolyte member extending into alkali metal in said anode region and separating a contact breaker region from alkali metal in said anode region, a body of the alkali metal contained in the contact breaker region, normally up to at least a predetermined level in a functional undamaged cell, a first electrically conductive member providing electronic interconnection between alkali metal in the contact breaker region and alkali metal in the anode region when at the minimum state of charge of the cell, and a second electrically conductive member providing electronic interconnection between the connection terminal associated with the anode current collector and said alkali metal in the contact breaker region only when at and above said predetermined level.

2. An alkali metal cell as claimed in claim 1, wherein said further solid electrolyte member comprises a tubular element having an axis extending substantially vertically in the normal operating orientation of the cell.

3. An alkali metal cell as claimed in claim 2, wherein said first conductive member comprises a disc closing a lower end of said tubular element constituting the further solid electrolyte member.

4. An alkali metal cell as claimed in claim 2 or claim 3, wherein said solid electrolyte member separating the anode and cathode regions is tubular having an upper end closed by an electrically insulating ceramic lid, and said further electrolyte element is sealed in an aperture in the lid.

5. An alkali metal cell as claimed in claim 4, wherein said connection terminal associated with the anode current collector comprises an electrically conductive lid sealing an upper end of said tubular element constituting the further solid electrolyte member, and said second conductive member is formed as a conductive rod extending downwards from the conductive lid to said predetermined level in the contact breaker region.

6. An alkali metal cell as claimed in any preceding claim, wherein said predetermined level is above the level of alkali metal in the anode region when the cell is fully charged, and said anode current collector is arranged to rupture in response to over-pressure in the contact breaker region whereby the alkali metal in the contact breaker region leaks into the anode region leaving said second electrically conductive member isolated from alkali metal.

7. An alkali metal cell as claimed in claim 6, including a closure member sealed directly or indirectly to said solid electrolyte member separating the anode and cathode regions to seal off the anode region from ambient atmosphere and wherein said further solid electrolyte member is sealed to the closure member to seal the contact breaker region from the anode region, over-pressure in the contact breaker region fracturing the seal between said further solid electrolyte member and the closure member without unsealing the anode region.

8. An alkali metal cell as claimed in claim 7, wherein the closure member is constituted by said connection terminal associated with the anode current collector.

* * * * *